No. 665,190. Patented Jan. 1, 1901.
J. T. DAVENPORT.
TOE WEIGHT.
(Application filed July 22, 1899.)
(No Model.)
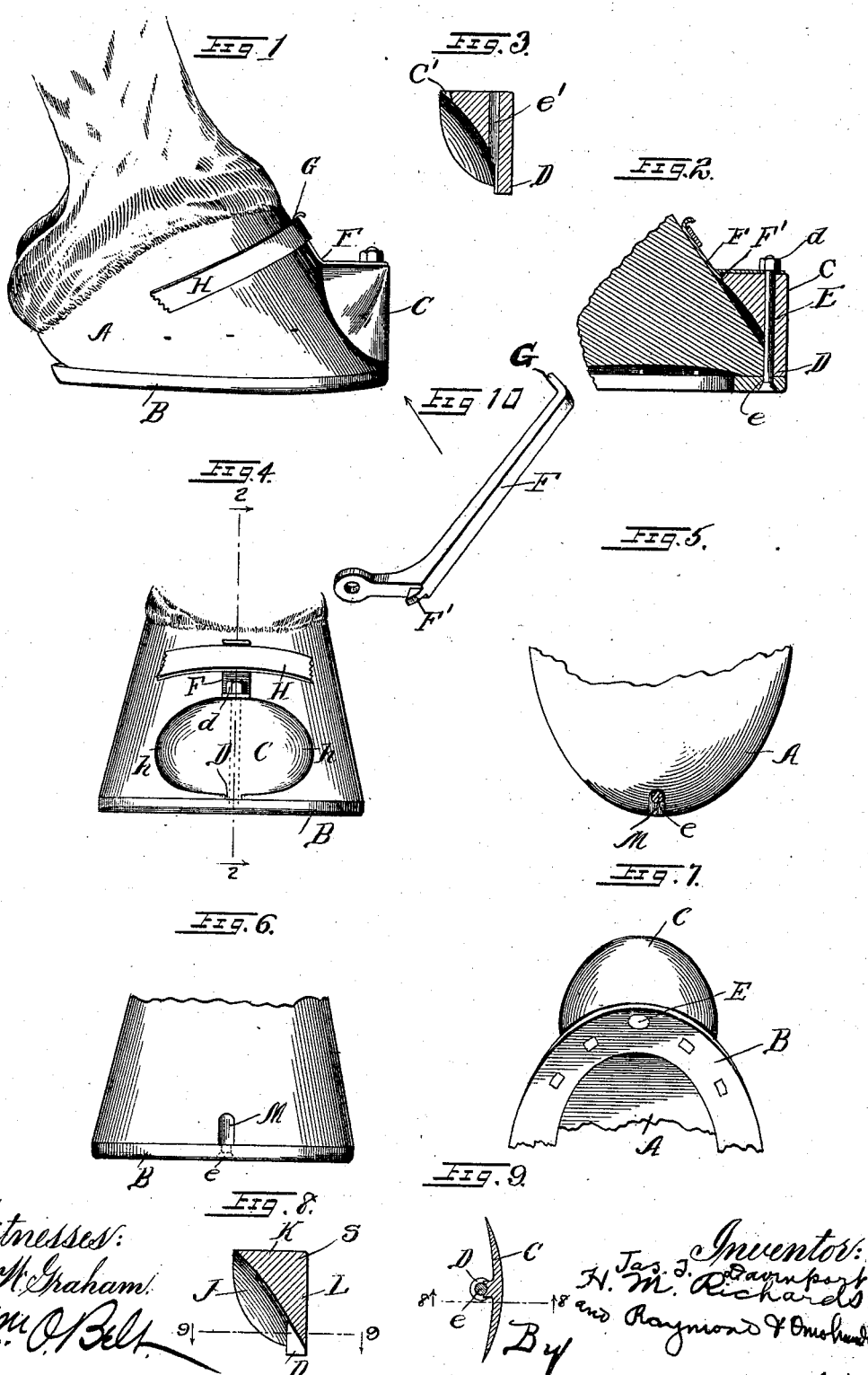
Witnesses:
C. W. Graham
Wm. O. Belt
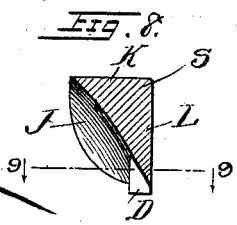
Inventor:
Jas. T. Davenport
H. M. Richards
By Raymond & Omohundro
Att'ys
THE NORRIS PETERS CO., PHOTO-LITHO., WASHINGTON, D. C.

UNITED STATES PATENT OFFICE.

JAMES T. DAVENPORT, OF GALESBURG, ILLINOIS.

TOE-WEIGHT.

SPECIFICATION forming part of Letters Patent No. 665,190, dated January 1, 1901.

Application filed July 22, 1899. Serial No. 724,765. (No model.)

*To all whom it may concern:*

Be it known that I, JAMES T. DAVENPORT, a citizen of the United States, residing at Galesburg, in the county of Knox and State of Illinois, have invented certain new and useful Improvements in Toe-Weights for Horseshoes, of which the following is a specification.

My invention relates to certain new and useful improvements in toe-weights for horseshoes; and its primary object is to provide a device of this character of novel construction which will bring the weight at the lowest point in front of the hoof without in any way interfering with the comfort or movement of the horse.

A further object of the invention is to relieve the horse's hoof of not only the pressure of the weight, but of strain produced by the fastening devices in attaching it to the shoe, whereby injury to the hoof is prevented and reliance upon the hoof for sustaining the weight in position is entirely avoided, as well as the weight being rendered capable of attachment to a shoe of any kind regardless of the shape or condition of the horse's hoof.

A further object of the invention is to construct a toe-weight in such a way that it can be securely fastened to the extreme forward part of the shoe, whereby the best results will be secured and the movement of the horse will be materially improved; and a further object of the invention is to provide a toe-weight and fasten it onto the shoe of a horse in such a way that the weight will be carried on the front part of the shoe and not on the hoof.

My invention also has other objects in view which will be hereinafter pointed out in connection with the detail description and in the claims, reference being had to the accompanying drawings, in which—

Figure 1 shows my improved toe-weight arranged in place on a horse's foot. Fig. 2 is a central sectional view on the line 2 2 of Fig. 4. Fig. 3 is a detailed central sectional view of the weight. Fig. 4 is a front view of the device shown in the position illustrated in Fig. 1. Fig. 5 is a plan view of the forward part of a horse's hoof prepared to receive the toe-weight, with the fastening-bolt shown in section. Fig. 6 is a front view of a portion of a horse's hoof with the toe-weight removed. Fig. 7 is a perspective view of the hoof with the weight attached looking at the same in the direction indicated by the arrow in Fig. 1. Fig. 8 is a sectional view of the weight on the line 8 8 of Fig. 9. Fig. 9 is a sectional view on the line 9 9 of Fig. 8, and Fig. 10 is a perspective view of the strap-holder looking at the same from the under side.

Referring to the drawings, in which like letters of reference denote corresponding parts in all of the figures, A designates the hoof of the horse, and B the shoe. The weight C is arranged on the hoof, but secured to the shoe at the forward center point thereof, as shown in Figs. 1 and 4, a lug D being provided on the under side of the lower edge of the weight to rest upon the shoe, so that the weight will be supported and carried on the shoe instead of on the hoof, as is usual with most toe-weights now in use. The lug may be of any suitable dimensions and will of course vary in size with the varying sizes of toe-weights used, and, indeed, instead of the specific lug shown the lower face of the toe-weight may be flattened in any manner, so as to afford a firm bearing and support for it upon the shoe, so that no reliance need be placed upon the hoof for maintaining the weight in position. In fact, the weight will be practically as well supported without the proximity of the hoof as with it, although in practice it will generally fit snugly around the surface of the hoof, as the inner face thereof is curved to conform with the curvature of the hoof, and practically all hoofs have the same curvature or arc at the center, where the weight is applied, and this is true whether the weight be a one-ounce or a ten-ounce weight. Of course in some instances the weight may bear slightly upon the hoof when in position either at its center or at its two side edges; but my purpose is to so shape the weight that neither the pressure of the weight itself nor the pressure arising from fastening the weight to the shoe shall be directed against or upon the horse's hoof.

The weight is secured in place by means of a bolt E, which extends through an opening $e$ in the shoe and an opening $e'$ in the weight, the head of said bolt being located in the opening in the shoe, and the upper end of the bolt being provided with a thread to receive a nut $d$. A strap-holder F is provided with an eye through which the bolt E passes, and it extends rearwardly over and parallel with the top of the weight and upward and has its upper end G turned over, so that the strap H, which passes around the hoof and over the arm, will not become displaced, being always held from slipping off the arm by the turned-over end G.

The strap-holder, which is clearly shown in Figs. 1, 2, and 10, is angular in shape to conform to the shape of the top of the weight and the front of the horse's hoof, and at the corner of the angle, but on the lower side thereof, the holder is provided with a projection F', which enters a complementary notch C' in the rear upper edge of the toe-weight, which prevents any lateral swinging of the strap-holder upon the bolt E as a pivot either in tightening up the nut on said bolt or from any twisting strain resulting from the strap H.

The strap referred to is not specially designed for use in connection with the securing of the toe-weight to the shoe, but is one of the straps of a quarter-boot, and the strap-holder while primarily intended to prevent this strap from slipping up, which is a common fault with quarter-boots, and thus enables the firmer securing of the boot on the hoof, performs the further function of assisting the bolt E in holding the toe-weight in position, especially in action. In other words, the strap-holder also acts as a kind of stay or guy-rod for the bolt when the quarter-boot is in use. Furthermore, in case the quarter-boot strap H breaks the lug or projection F'' on the strap-holder would prevent the strap-holder from working around where it might cause injury to the horse. However, when a quarter-boot is not used in connection with the toe-weight the strap-holder is dispensed with, and sole reliance is placed on the bolt E for holding the weight in position.

Another feature of importance is that with the bolt passing through the toe-weight near the forward edge thereof and through the groove in the lug D on the toe-weight, in which about half of the bolt rests, much cutting away of the hoof is avoided, which is usually necessary in attaching toe-weights. Furthermore, there is no necessity for fitting the toe-weight to the horse's hoof, as it is supported wholly, or practically so, upon the shoe and reliance need not be placed upon the hoof for any support, which feature is of the utmost importance in making a commercial article out of a horseshoe toe-weight, for standard sizes and proportions may be adopted that can be applied to any horseshoe.

In order to distribute the metal of the weight so that the greatest proportion thereof will project forward, I make the weight of peculiar form, the same comprising a nose S, from which the sides $h$ are beveled around to the points where the weight engages the hoof, the under side of the weight being recessed, as shown at J, to fit snugly over the hoof. The upper face and the front face L of the weight are substantially flat and they are rounded off and carried back to join the reduced sides $h$. By this construction of the toe-weight I am able to arrange the greatest proportion of the metal in the foremost position, which will greatly increase the effectiveness of the device and cause the horse to throw its foot forward and downward. The hoof may be recessed, as shown at M, to provide for the bolt E, which, it will be observed, is perfectly straight and holds the weight securely in place on the shoe, the shoe supporting and carrying the weight, which need not rest against the hoof.

Another important advantage is that in the use of my toe-weight there is no projection of the toe-weight beyond the forward edge of the shoe for any size of weight, and the straight vertical front edge and tapering sides of the weight are so disposed that in action the folding of the front leg is such as to give the greatest clearance for the passage of the hind leg, thus reducing to the minimum all danger of the weight being knocked off by being struck by the hind hoof or leg of the horse.

Having thus fully described my invention, what I claim, and desire to secure by Letters Patent, is—

1. A toe-weight for horseshoes having a grooved lug depending from the body portion of the weight and resting upon the upper surface of the shoe and affording a rest for the weight on the shoe and a passage for the fastening-bolt, and a straight bolt passing through the shoe and the grooved lug and the weight and securing the weight on the shoe, substantially as described.

2. A toe-weight for horseshoes having a lug adapted to rest upon the shoe, a bolt extending through the shoe the lug and the weight, and a strap-holder secured to the upper surface of the weight by said bolt, substantially as described.

3. A toe-weight for horseshoes adapted to be supported wholly on the shoe, and a strap-holder secured to the upper surface of the weight and provided with a downwardly-projecting lug, the latter being adapted to enter a notch in the weight, substantially as described.

4. A toe-weight for horseshoes provided with a flattened bottom to rest upon the shoe, and an angular strap-holder attached to the weight and extending over the top of the weight and up against the hoof, substantially as and for the purpose described.

5. A toe-weight for horseshoes provided with a lug at its bottom to rest upon the shoe, a strap-holder at the top of the weight, and a bolt securing the weight and strap-holder to the shoe, substantially as described.

JAMES T. DAVENPORT.

Witnesses:
H. A. SMITH,
MORT KELLY.